United States Patent [19]

Bernard

[11] 4,392,572

[45] Jul. 12, 1983

[54] BICYCLE STORAGE RACK

[76] Inventor: Walter Bernard, 4800 South Lake Park Ave., Chicago, Ill. 60615

[21] Appl. No.: 200,256

[22] Filed: Oct. 23, 1980

[51] Int. Cl.³ .............................................. A47F 7/04
[52] U.S. Cl. ....................................... 211/19; 248/339
[58] Field of Search ........................ 211/18, 19, 20, 21, 211/22, 87; 248/339

[56] References Cited

U.S. PATENT DOCUMENTS

| D. 36,091 | 9/1902 | Merritt | 211/22 |
| 3,305,101 | 2/1967 | Mills | 211/87 |
| 3,488,025 | 1/1970 | Rowland | 248/339 |

FOREIGN PATENT DOCUMENTS

| 327965 | 3/1958 | Switzerland | 211/19 |
| 14035 | of 1898 | United Kingdom | 211/20 |
| 399941 | 10/1933 | United Kingdom | 211/20 |
| 529823 | 11/1940 | United Kingdom | 211/18 |

Primary Examiner—Francis K. Zugel
Assistant Examiner—Robert W. Gibson, Jr.
Attorney, Agent, or Firm—Balogh, Osann, Kramer, Dvorak, Genova & Traub

[57] ABSTRACT

The bicycle storage rack has a member which is provided with a channel for receiving a bicycle tire. The member is adapted to be vertically mounted on a wall, the upper end of the member being provided with means, such as a hook portion, which is to support the bicycle from the wall by means of its front wheel. The hook portion is preferably integrally formed with the member. To support the small-wheeled bicycle, a hanger element is provided to cooperatively interengage with the member.

8 Claims, 5 Drawing Figures

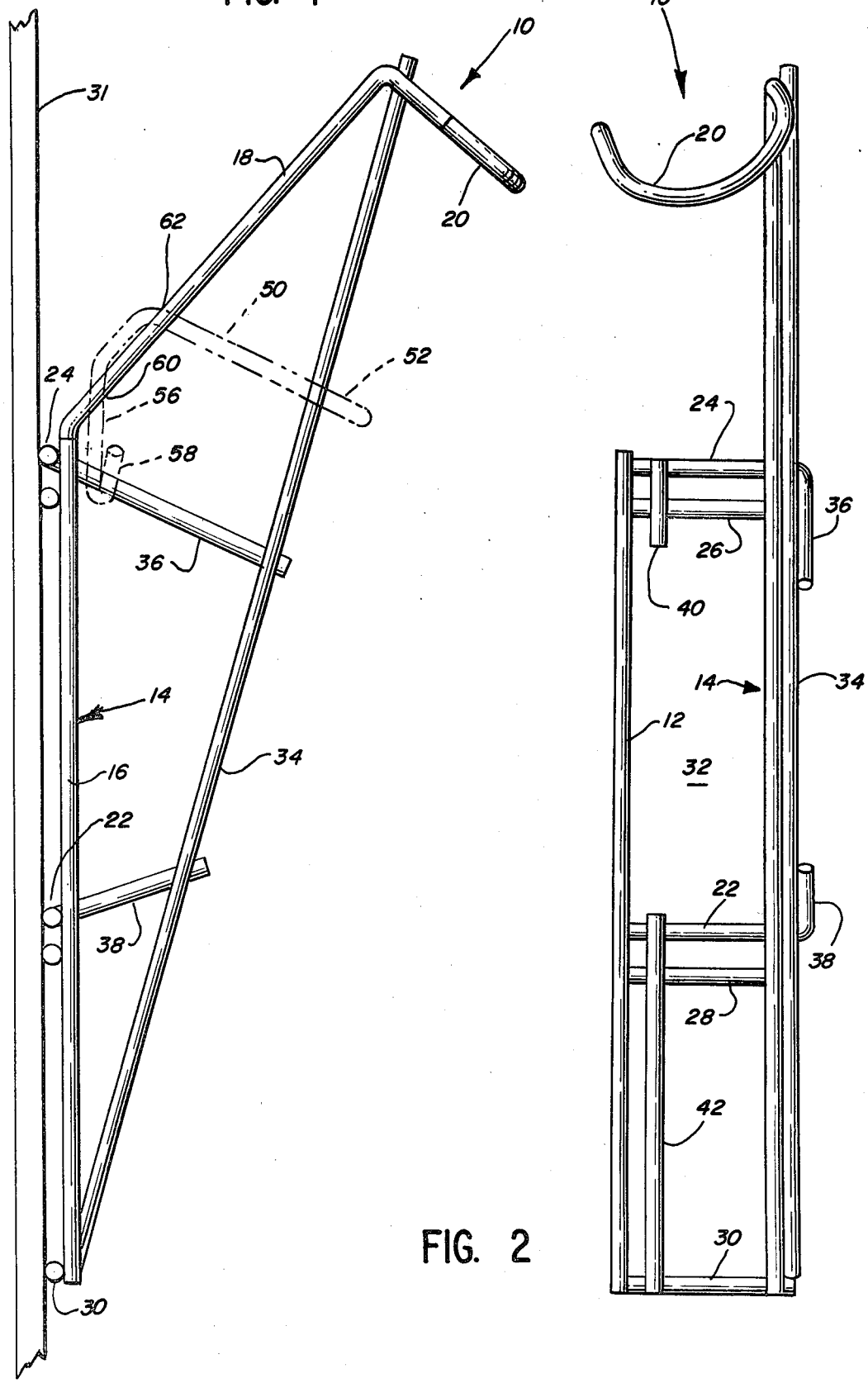

BICYCLE STORAGE RACK

BACKGROUND OF THE INVENTION

This invention relates generally to a rack for storing articles, and more particularly, to a rack for storing a bicycle on a substantially vertical or inclined wall.

Racks for storing bicycles are well known. However, these racks support the bicycles generally on horizontal surfaces which may or may not form parts of the racks.

Since a bicycle stored on a horizontal surface requires substantial space for storing, it is desirable to store the bicycle substantially in a vertical plane, that is, the longitudinal axis of the bicycle occupies a vertical position, wherein the bicycle is suspended or hung from a substantially vertical surface such as a wall or, in the alternative, a series of bicycles may be suspended from a self-supporting frame placed in a bicycle storage room.

Although most of the prior art racks are concerned with the storage of bicycles on a substantially horizontal surface, some racks have also been manufactured for storing bicycles suspended from a vertical wall. For example, U.S. Pat. No. 607,024 describes a bicycle holder, wherein the bicycle is supported by or from a vertical wall. Another form of a holder for supporting a bicycle from a vertical wall is disclosed in U.S. Pat. No. 611,856. In both of the foregoing bicycle holders, the bicycle is supported primarily by devices which form an attachment between a bicycle frame and the vertical wall. This type of attachment is not too satisfactory because of the different variations in bicycle frame constructions.

The present invention differs from the previously known bicycle racks by providing an arrangement wherein the bicycle is totally supported by one of its wheels, in cooperation with a lateral support to keep the bicycle wheel in a vertical plane, wherein the bicycle is suspended vertically from a wall or from a self-supporting frame.

Accordingly, the object of the invention is to provide a new and improved rack for storing the bicycle from a substantially vertical surface, such as a wall.

Another object of the invention is to provide a rack for supporting the bicycle off the floor.

A still further object of the invention is to provide a rack which is adapted to support large- and small-wheeled bicycles.

A further object of the invention is to provide a rack simply constructed of rod members which are prepared from one size stock and sturdily welded together.

SUMMARY OF THE INVENTION

According to the present invention, there is provided, a bicycle storage rack comprising at least one bicycle tire receiving channel member comprising a pair of rod members, spaced from each other to accommodate the treads of the bicycle tire, and one of the pair of rod members having an angular portion extending outwardly from the plane passing through the pair of spaced members, the angular portion being provided with a hook-like member adapted to receive the bicycle wheel. The spatial relationship between the two spaced rod members is maintained by two or more transverse members which define mounting positions for attachment of the rack to a wall surface. Short additional rod members are provided parallel to the rod members, to rigidize the transverse members. An attachable hanger element, provided with a hook portion, cooperates with the channel receiving member to accommodate the storing of a small-wheeled bicycle.

BRIEF DESCRIPTION OF THE DRAWINGS

FIG. 1 is a side view of the bicycle storage rack, as it would be viewed when attached to a wall surface.

FIG. 2 is a front view of the rack shown in FIG. 1.

DESCRIPTION OF THE PREFERRED EMBODIMENT

Figure 3:
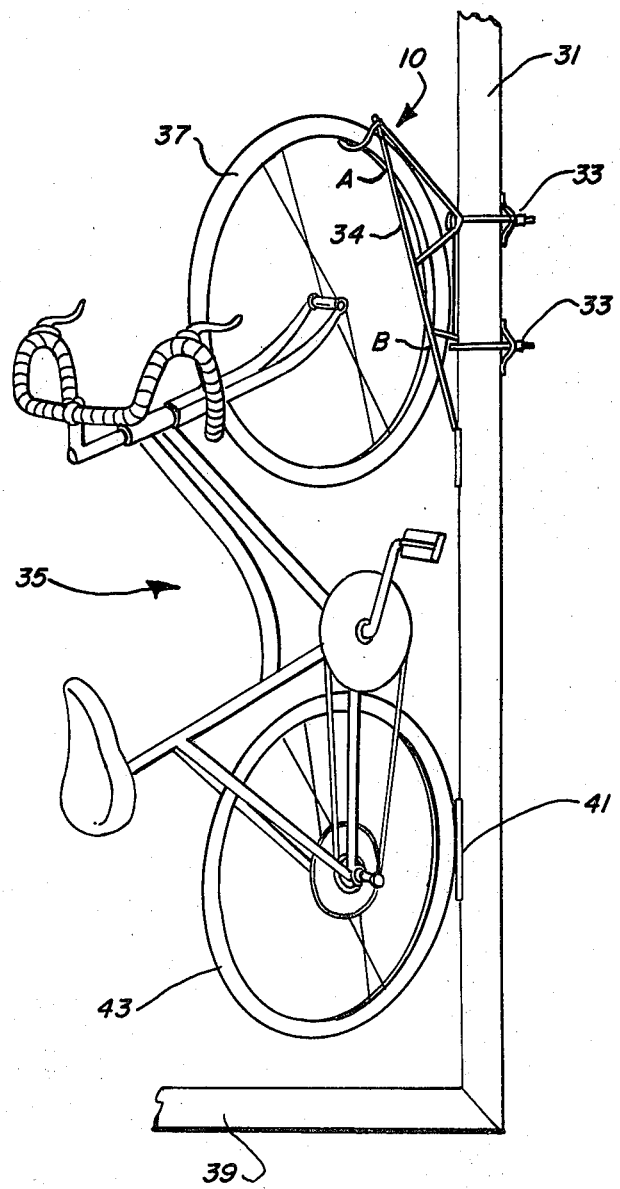
FIG. 3 is a perspective view of the rack mounted on a vertical wall and supporting a bicycle.

The bicycle storage rack 10 comprises a pair of parallel spaced rod members 12 and 14, the rod member 12 being short and the rod member 14 being long and having a configuration as shown in FIG. 1. The rod member 14 comprises a straight portion 16 corresponding in length to rod member 12, an angular portion 18, and a hook portion 20. The angular portion 18 extends outwardly out of the plane containing the rod member 12 and the straight portion 16 of the rod member 14.

The straight portion 16 is spaced from rod member 12 to define a channel 32 for receiving the treads of the bicycle tire. The spaced relationship between the rod member 12 and the straight portion 16 of rod member 14 is maintained by at least two transverse members, such as 24 and 22, which are secured to the rod members 12 and 14. The transverse members 24 and 22 have angular portions 36 and 38, respectively, which extend outwardly out of the plane containing the transverse members. Additional transverse members 26, 28 and 30 may be used.

In order to provide lateral stability to the front wheel of a bicycle when it is supported by the rack 10 mounted on the wall 31, there is provided a rod member 34 which extends from the transverse member 30 and terminates in a junction between the angular portion 18 and the hook portion 20 rod member 34 is longitudinally inclined relative to the pair of parallel spaced rod members 12 and 14. Preferably, the rod member 34 is secured by the angular portions 36 and 38 of the transverse members 24 and 22, the angular portions 36 and 38 extending between the rod member 34 and the straight portion 16 of the rod member 14. Preferably, the rod members, as particularly shown in FIG. 2, are welded to each other at various interconnecting positions. Additional support for the transverse members 26 and 24 is provided by a member 40. Similarly, transverse members 22, 28 and 30 are interconnected by a member 42, which extends between the transverse members 22 and 30.

The object of spacing the transverse members 24 and 26, and 22 and 28, is to provide a means for supporting the rack 10 from a wall surface. In other words, any suitable attachment means, such as a bolt-anchor device 33 (FIG. 3), can pass through between the spacing existing between the transverse members 24 and 26, as well as between 22 and 28. If additional securement to the wall is desired, bolts may pass through the spaces existing between members 12 and 40 and between 12 and 42.

Although the rack 10 is shown in FIGS. 1 and 3 secured to the wall 31, it can be secured to any vertical surface, such as may be defined by structural members of a self-supporting frame designed to hold a series of bicycles in vertical positions off the floor supporting the frame.

The manner of supporting the stored bicycle in a vertical position is illustrated in FIG. 3, wherein a bicycle 35 is vertically suspended by its front wheel 37 off the floor 39 by means of the rack 10 which is secured to the wall 31 or a self-supported frame by bolt-anchor devices 33. When the wheel 37 is supported by the hook portion 20, the treads of the bicycle tire will be received by the channel 32 which will act as a pad for support of the front wheel, and the wheel 37 will abut the rod member 34 at two positions A and B, the rod member 34 vertically aligning the wheel. To prevent the wall or frame 31 from being soiled or scuffed by lower wheel 43, a protective pad 41 may be attached to the wall. Such a pad may also be used on the wall under channel 32.

Since a small-wheeled bicycle cannot be properly supported from the hook portion 20, or any bicycle having a wheel which, when supported by the hook portion 20, would not be properly received in the channel 32 and supported by the rod member 34, means have to be provided for this purpose, as described hereinafter.

Figure 5:
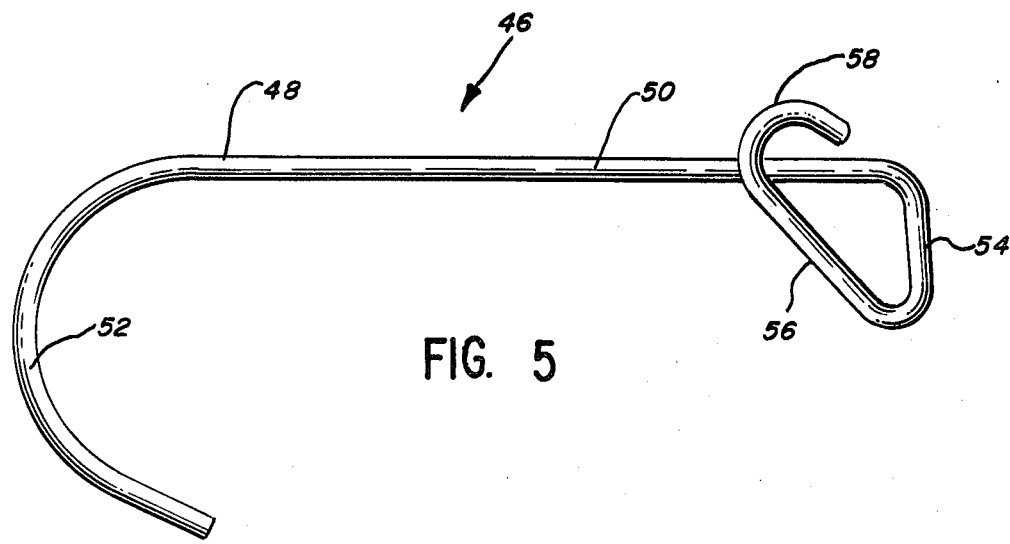
FIG. 5 is an elevational view of the hanger element shown in FIG. 4.
Figure 4:
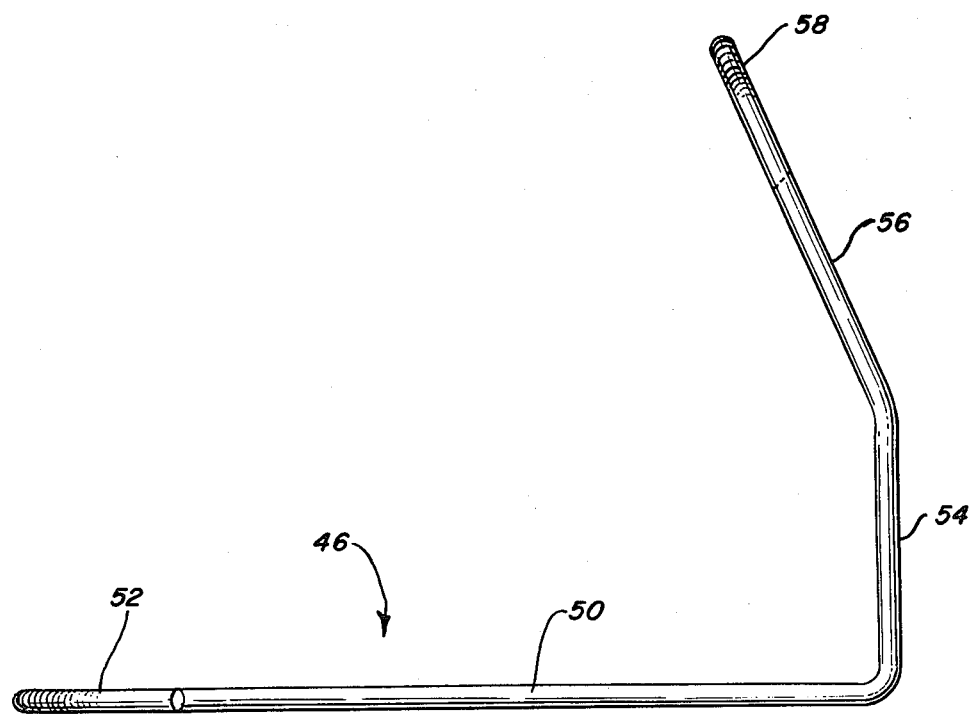
FIG. 4 is a side view of a hanger element which can be used in conjunction with the bicycle rack for supporting a child's bicycle having small-diameter wheels.

Reference is now made to FIGS. 4 and 5, which illustrate a hanger element 46 made from a rod member 48 having a straight portion 50, a hook portion 52, and an elevated portion 54 which extends out of a plane containing the straight portion 50 and the hook portion 52, including an inclined portion 56 and a U-shaped hook portion 58.

To support a small-wheeled bicycle, the hanger element 46 is attached to the rack 10 as shown in FIG. 1, wherein the U-shaped hook portion 58 engages the angular portion 36 of the transverse rod 24. The inclined portion 56 on the hanger element 46 will abut the angular portion 18 of the rod member 14 at position 60, and the straight portion 50 will also abut the angular portion 18 of the rod member 14 at position 62. The hook portion 52 will occupy a position below the hook portion 20 and spaced inwardly toward the rod members 12 and 14. Since the hook portion 52 is located closer to the rod members 12 and 14, a small-wheeled bicycle will have its tire treads properly received in the channel 32 between the rod members 12 and 14.

Although the various rod members described herein are made from a single size round stock, it is apparent that other structural members having different cross-sectional shapes can be utilized.

From the foregoing description, it is apparent what particular advantages have been obtained with this novel bicycle rack. This bicycle rack has been particularly designed for use in apartment buildings and condominiums or any place where storage space is at a premium. The rack is designed to support the bicycle by means of its front wheel engaged by the hook portion 20, the bicycle tire being accommodated by the channel 32, and prevented from pivoting by the rod member 34 which provides lateral support.

Since the hanger element 46 is removably attached to the rack, the rack can be used interchangeably for large- and small-wheeled bicycles. If a more permanent arrangement is desired for supporting a small-wheeled bicycle, other forms of hanger elements can be used by attaching them to the transverse members 24 and 26 of the rack by means of a bolt and nut.

The bicycle rack is simply constructed of rod members which are readily welded together and form an inexpensive rack for supporting the bicycle. The features of the bicycle rack are further enchanced by providing the hanger element 46 so that the rack may be adapted for supporting a small-wheeled bicycle or any other bicycle which would be properly supported by the hook portion 20.

It should be understood that the foregoing description relates to only a preferred embodiment of the invention, and that numerous modifications or alterations may be made therein without departing from the spirit and scope of the invention as set forth in the appended claims.

What is claimed is:

1. A storage rack for storing a small-wheeled bicycle on a vertical surface comprising;
    means defining a channel for receiving a bicycle tire;
    means integrally formed with said channel means for supporting a front wheel of a bicycle;
    means for providing lateral stability to the front wheel of the bicycle, said providing means connected to said channel means and cooperating with said integrally formed means; and
    means attachable to said channel means cooperating with said integrally formed means and engaging said providing means for supporting the front wheel of a small-wheeled bicycle;
    said attachable means comprising a rod member having a straight portion abutting said channel means, a hook portion spaced inwardly toward said channel means, and an elevated portion extending out of a plane containing the straight portion and the hook portion, and including an inclined portion and a U-Shaped hook portion engaging said providing means whereby when the rack is mounted on a vertical surface the small-wheeled bicycle is totally suspended by its front wheel.

2. A bicycle storage rack according to claim 1, said means defining the channel comprising a pair of spaced rod members defining said channel, and at least two transverse members secured to said rod members.

3. A bicycle storage rack for use on a vertical surface comprising;
    a pair of spaced parallel rod members adapted to form a channel to receive the treads of a tire on a bicycle wheel;
    one of said spaced rod members comprising;
    an angular portion extending outwardly out of the plane containing said spaced rod members;
    at least a pair of transverse members securing said spaced rod members together, each of said pair of transverse members including an angular portion extending outwardly out of the plane containing said transverse members;
    means for providing lateral stability to the front wheel of the bicycle when supported on the rack, said providing means comprising a rod member longitudinally inclined relative to said pair of spaced rod members and engaging the angular portions of said transverse members and said one of said spaced rod members, and adapted to abut and vertically align the front wheel of a bicycle when supported on the rack; and
    means at a junction of said longitudinally inclined rod member and the angular portion of said one of said spaced rod members, for supporting the front wheel of a bicycle, whereby when the rack is mounted on a vertical surface such as a wall or self supported frame, the bicycle is totally suspended by its front wheel off the floor.

4. A bicycle storage rack according to claim 3, including additional transverse members spaced parallel from said other transverse members, whereby said rack can be mounted on a wall by introducing securing means between said spaced transverse members for engagement with said wall or said frame.

5. A bicycle storage rack according to claim 3, including at least one short rod member spaced between said pair of parallel spaced rods and secured to said transverse members to thereby provide additional rigidity.

6. A bicycle storage rack according to claim 6, including a hanger element having a U-shaped hook attachable to the angular portion of one of said transverse members and having a hook portion overlying said channel for supporting a small-wheeled bicycle.

7. A bicycle storage rack according to claim 3, wherein said means for supporting the front wheel of the bicycle is formed integrally with the angular portion of said one spaced rod member.

8. A bicycle storage rack according to claim 8, wherein said means comprises a hook portion extending from said angular portion.

* * * * *